(12) United States Patent
Freidl

(10) Patent No.: US 9,777,638 B2
(45) Date of Patent: Oct. 3, 2017

(54) SYSTEMS AND METHODS FOR TURBINE SYSTEM RESTARTS

(71) Applicant: General Electric Company, Schenectady, NY (US)

(72) Inventor: Roman Freidl, Spring, TX (US)

(73) Assignee: General Electric Company, Schenectady, NY (US)

( * ) Notice: Subject to any disclaimer, the term of this patent is extended or adjusted under 35 U.S.C. 154(b) by 61 days.

(21) Appl. No.: 15/017,055

(22) Filed: Feb. 5, 2016

(65) Prior Publication Data

US 2017/0226932 A1 Aug. 10, 2017

(51) Int. Cl.
*F02C 7/262* (2006.01)
*F02C 7/268* (2006.01)
*F02C 3/04* (2006.01)
*F01D 15/10* (2006.01)

(52) U.S. Cl.
CPC .............. *F02C 7/262* (2013.01); *F01D 15/10* (2013.01); *F02C 3/04* (2013.01); *F02C 7/268* (2013.01); *F05D 2220/32* (2013.01); *F05D 2240/60* (2013.01); *F05D 2270/40* (2013.01)

(58) Field of Classification Search
CPC .. F02C 7/262; F02C 7/268; F02C 3/04; F02D 15/10; F02D 2220/32
See application file for complete search history.

(56) References Cited

U.S. PATENT DOCUMENTS 9,272,698 B2 * 3/2016 Wang .................... B60W 10/06
2011/0136620 A1 * 6/2011 Gibson ................. B60W 10/02
477/64

* cited by examiner

*Primary Examiner* — Anne M Antonucci
(74) *Attorney, Agent, or Firm* — Fletcher Yoder, P.C.

(57) ABSTRACT

A turbine system includes a compressor system compressing a fluid, a combustor system fluidly coupled to the compressor to combust a fuel mixed with the fluid to produce a combusted fluid, a gas turbine system fluidly coupled to the combustor to rotate a gas turbine shaft based on the combusted fluid, a power turbine system fluidly coupled to the gas turbine to rotate a power turbine shaft based on the combusted fluid existing the gas turbine, the shaft mechanically coupled to a clutch system, a clutch system mechanically coupled to a generator shaft, and an electric generator having the generator shaft to produce electricity based on rotations of the generator shaft. The turbine system includes a controller operatively coupled to the clutch system to restart production of the electricity via the clutch system.

19 Claims, 5 Drawing Sheets

SYSTEMS AND METHODS FOR TURBINE SYSTEM RESTARTS

BACKGROUND

The subject matter disclosed herein relates to power generation systems. Specifically, the embodiments described herein relate to restarting a turbine system.

In a power generation system, such as a gas turbine system mechanically coupled to an electric generator system, the gas turbine system is provided fuel via a fuel supply and an oxidizer (e.g., air) and then started. More specifically, during startup, the gas turbine system combusts the fuel to provide for rotative power of a shaft, which may then turn a load, such as the electric generator system. The gas turbine system may then be ramped up or given more fuel until the overall power generation system is producing full power. The power may then be transmitted to certain users, such as power grid users. In some cases, the power generation system may be shut down or otherwise turned off. During the shut down process or shortly afterwards, it may be desirable to restart the power generation system. Accordingly, it would be beneficial to improve on techniques to restart the power generation system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a turbine system includes a compressor system configured to compress a fluid, a combustor system fluidly coupled to the compressor and configured to combust a fuel mixed with the fluid to produce a combusted fluid, a gas turbine system fluidly coupled to the combustor and configured to rotate a gas turbine shaft based on the combusted fluid, a power turbine system fluidly coupled to the gas turbine and configured to rotate a power turbine shaft based on the combusted fluid existing the gas turbine, the shaft mechanically coupled to a clutch system, a clutch system mechanically coupled to a generator shaft, and an electric generator having the generator shaft and configured to produce electricity based on rotations of the generator shaft. The turbine system further includes a controller operatively coupled to the clutch system and configured to restart production of the electricity via the clutch system after a request for shutting down the gas turbine system but before the gas turbine system is shut down.

In a second embodiment, a method includes receiving, via a controller, a request from an electric grid to restart a gas turbine system mechanically coupled to an electric generator through a plurality of shafts having a clutch system, wherein the electric generator is configured to produce electricity. The method further includes restarting, via the controller, production of the electricity by actuating the clutch system after the request for but before the gas turbine system is shut down. Restarting production comprises executing, via the controller, a first and a second control zone based on a comparison of a gas turbine shaft speed (NGEN) to a natural core idle speed, wherein the natural core idle speed comprises a speed when the compressor system is running idle the clutch system dis-engaged and a power turbine settles at its natural speed, wherein the plurality of shafts comprise at least a turbine generator shaft, a power turbine shaft, and an electric generator shaft, and wherein the clutch system mechanically couples the power turbine shaft to the electric generator shaft.

In a third embodiment, a non-transitory, computer-readable medium includes executable code having instructions. The instructions are configured to receive a request from an electric grid to restart a gas turbine system mechanically coupled to an electric generator through a plurality of shafts having a clutch system, wherein the electric generator is configured to produce electricity. The instructions are further configured to restart production of the electricity by actuating the clutch system after the request for but before the gas turbine system is shut down. Restarting production comprises executing a first and a second control zone based on a comparison of a gas turbine shaft speed (NGEN) to a natural core idle speed, wherein the natural core idle speed comprises a speed when the compressor system is running idle with the clutch system dis-engaged and the power turbine settles at the natural core idle speed, wherein the plurality of shafts comprise at least a turbine generator shaft, a power turbine shaft, and an electric generator shaft, and wherein the clutch system mechanically couples the power turbine shaft to the electric generator shaft.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
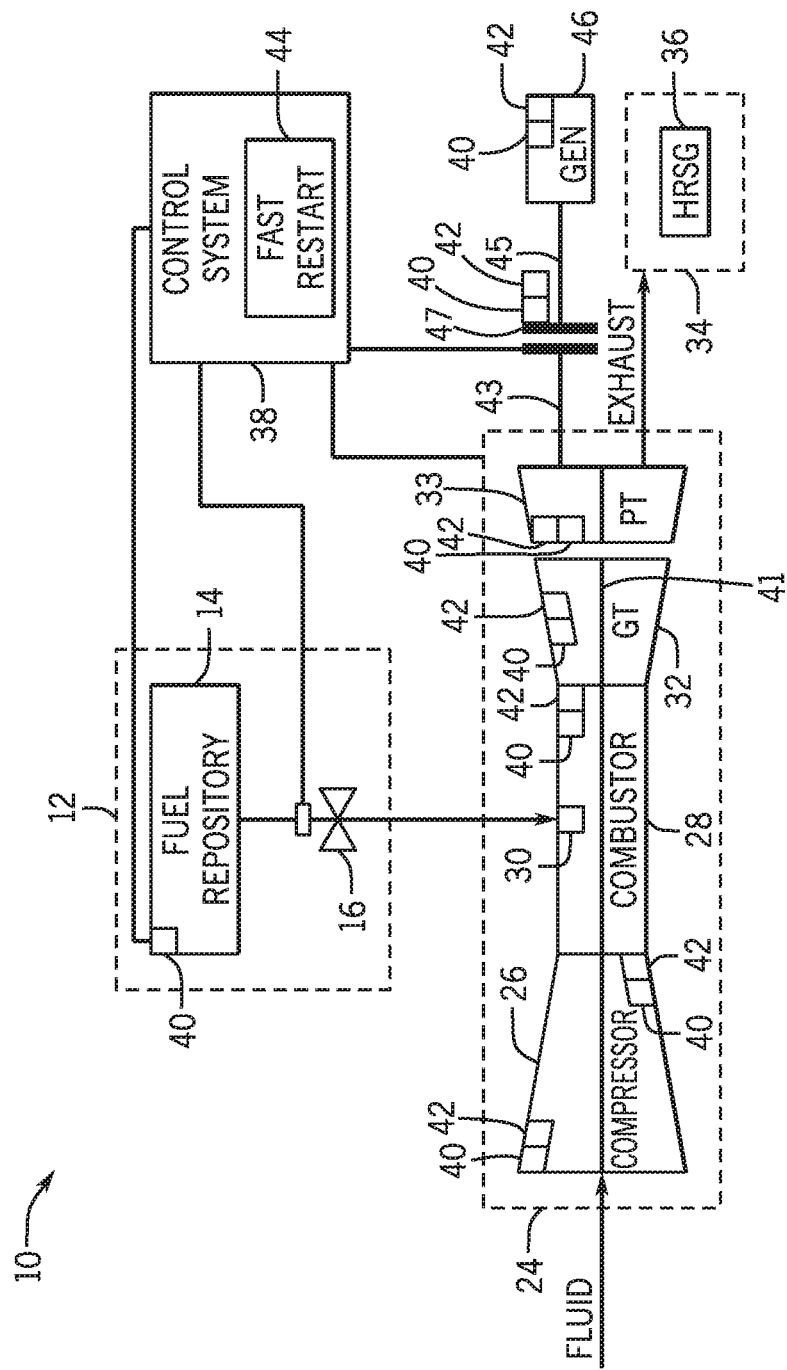
FIG. 1 is a schematic view of a power generation system including a control system having a fast restart system, in accordance with an embodiment of the present approach.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. When a set of guide vanes is described as "closed," it is intended to mean that the blades of the guide vanes are positioned at a relatively small angle. When a set of guide vanes are described as "open," it is intended to mean that the blades of the guide vanes are positioned at a relatively large angle.

Present embodiments relate to systems and methods for restarting power generation systems, such as power generation systems that include a gas turbine system mechanically coupled to an electric generator system. During a restart process, the techniques described herein enable the power generation system to ramp back up to full power load in a more efficient and timely manner. For example, the power generation system may begin ramping up and producing power without having to wait for a full shut down to occur. Indeed, when directed, for example, by a grid authority to provide power when in a shut down process, the techniques described herein may enable a restarting or ramping up of the power generation system without having to incur a wait time related to a complete shut off (and sometimes, cooling off period), of the certain systems (e.g., gas turbine, power turbine).

In one embodiment, a two speed zones are derived for which different control schemes are applied, for example, via a power production system controller. A first speed zone is a speed-control zone which is above a natural core idle speed of a gas turbine and thus a power turbine may follow a given speed reference. A second speed zone is an acceleration control zone which is below the natural core idle speed and only the rate of change of the speed of a gas turbine compressor may be controlled. Natural core idle speed may be the operating point at which the gas turbine is held at generator idle speed and the power turbine stabilizes at a certain speed depending on the aerodynamic coupling of the generator to the power turbine, friction losses and other factors. The two speed zones are derived and then certain control actions may be applied based on which speed zone the power generation system is experiencing, as described in more detail below, to arrive at a more efficient and faster power supply system restart.

With the foregoing in mind, FIG. 1 illustrates a power generation system 10 that may be used to provide power to a load, such as an electric generator, a mechanical load, and so on. The power generation system 10 includes a fuel supply system 12, which includes a fuel repository 14 and a fuel control valve 16 that controls the amount of fuel supplied to the power generation system 10. The power generation system 10. The power generation system 10 also includes a turbine system 24 which in turn includes a compressor 26, a combustion system 28 containing one or more fuel nozzles 30, a gas turbine 32, a power turbine 33, and an exhaust section 34. In certain embodiments, the exhaust section 34 may include a heat recovery steam generator (HRSG) 36. Further, a control system 38 oversees certain aspects of the power generation system 10. In particular, the control system 36 may work in conjunction with sensors 40 and actuators 42 to monitor and adjust the operation of the power generation system 10. For instance, the sensors 40 may include temperature sensors, oxygen sensor, pressure sensors, speed sensors, fuel flow sensors, fuel type sensors, and the like. The control system 38 may also include a fast restart system 44 to monitor and adjust the power generation system 10 based on certain conditions during restarting of the power production system 10, as described in further detail below. Restarting the power production system 10 as described herein involves not having to wait for a full shutdown of the power production system 10 before ramping (e.g., increasing speed) of certain system 10 components, such as the gas turbine 32 and/or the power turbine 33.

During operation of the power generation system 10, the fuel supply system 12 may provide fuel to the turbine system 24 via the fuel control valve 16. Similarly, oxidant fluid (e.g., air) may be provided to the compressor 26. In some embodiments, inlet guide vanes (IGVs) may be controlled by the control system 38 to increase or decrease the fluid incoming into the compressor 26. The fluid is then compressed before being sent to the combustion system 28. Within the combustion system 28, the fuel nozzle(s) 30 inject fuel that mixes with the compressed fluid to create a fluid-fuel mixture that combusts before flowing into the turbine system 32. The combusted fluid-fuel mixture drives one or more stages of the gas turbine 32, which may in turn drive a shaft 41. The speed of the shaft 41 is referred to herein as N25. Combusted fluid fuel mixture may also drive one more stages of the power turbine 33, which may in turn drive a shaft 43. The speed of the shaft 43 is referred to herein as NSD. The shaft 43 may be mechanically coupled to a shaft 45 included in the generator 46 via a clutch 47. Accordingly, the shaft 45 may be allowed to spin at the same or at different speeds from the clutch 43. The speed of the shaft 45 is referred to herein as NGEN. The mechanical coupling between the shaft 43 and the shaft 47 may via the clutch 47 may thus drive the generator 46 to produce electricity. As illustrated the clutch system 47 may be communicatively coupled to the control system 38, and may include sensors 40 and actuators 42. Accordingly, the control system 38 may control N25, NSD, and NGEN.

The combusted gases exit the power turbine 33 and vent as exhaust gases through the exhaust section 34. In the depicted embodiment, the exhaust gases pass through the HRSG 36, which recovers the heat from the exhaust gases to produce steam. That is, the depicted power generation system 10 may be a combined cycle or co-generation system, such that the steam is used to drive a downstream steam turbine (i.e., a combined cycle system) or for a co-generation process. Additionally or alternatively, the exhaust gases may pass through other components within the exhaust section 34, such as catalytic converter systems.

Figure 2:
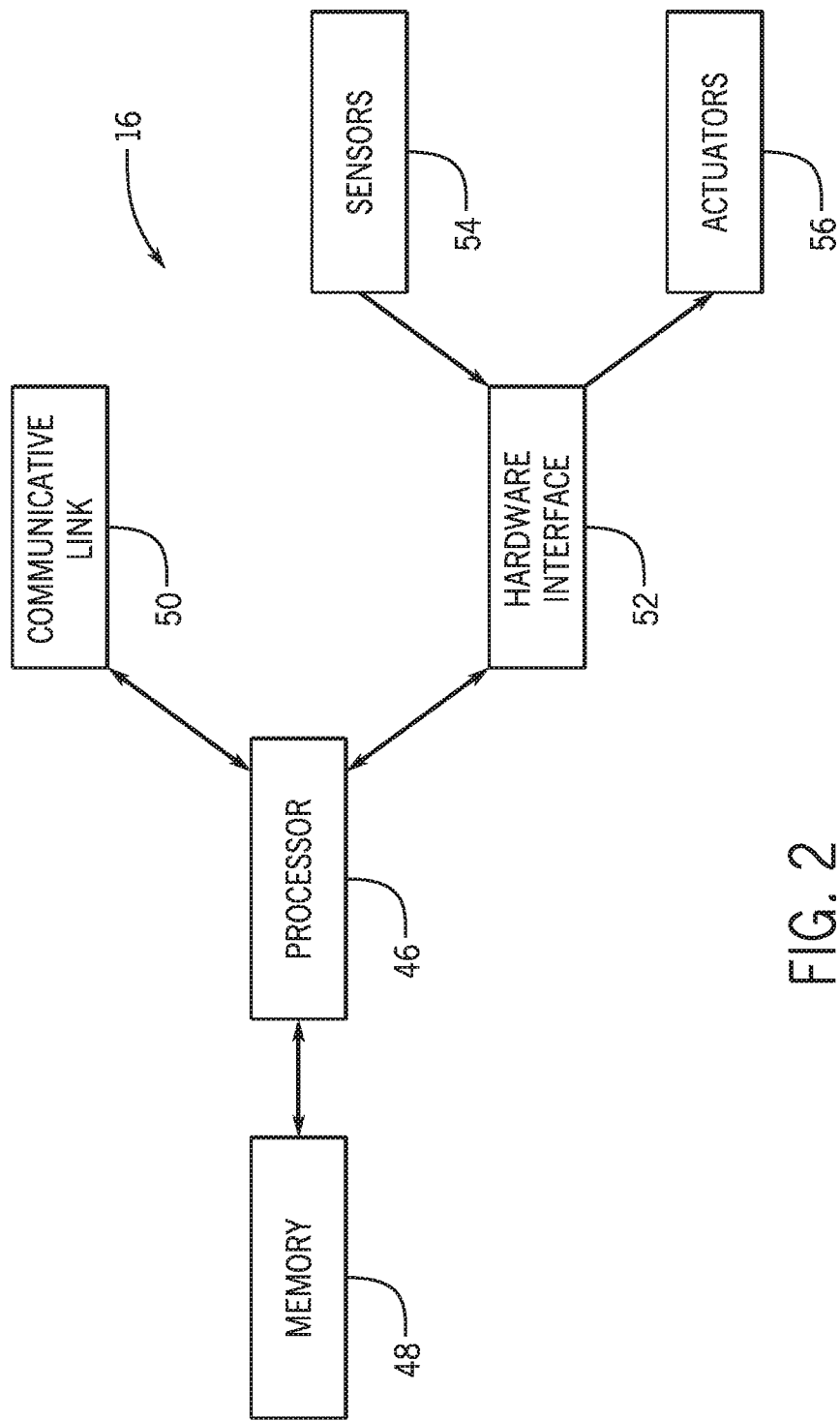
FIG. 2 is a block diagram of the control system within the power generation system of FIG. 1, in accordance with an embodiment of the present approach.

As mentioned above, the control system 38 may control certain aspects of the operation of the power generation system 10, such as restarting operations. The control system 38 includes memory 48, a processor 50, and a hardware interface 52 for interacting with the sensors 40 and the actuators 42, as depicted in FIG. 2. As depicted, the processor 50 and/or other data processing circuitry may be operably coupled to memory 48 to retrieve and execute instructions for managing the power generation system 10. For example, these instructions may be encoded in programs or software that are stored in memory 48, which may be an example of a tangible, non-transitory computer-readable medium, and may be accessed and executed by the processor 50 to allow for the presently disclosed techniques to be performed. The memory 48 may be a mass storage device, a FLASH memory device, removable memory, or any other non-transitory computer-readable medium. Additionally and/or alternatively, the instructions may be stored in an additional suitable article of manufacture that includes at least one tangible, non-transitory computer-readable medium that at least collectively stores these instructions or routines in a manner similar to the memory 48 as described above. The control system 38 may also communicate with the sensors 40 and the actuators 42 via the hardware interface 52, as stated above, including through wired and wireless conduits. In some embodiments, the control system 38 may include a triple modular redundant control system (TMR) having three processing cores, R, S T. In these embodiments, the TMR may "vote" on certain decisions to provide for redundant control operations of the control system 38. By providing for redundant operations, the control system 38 may enable a more robust and improved power production system 10.

Figure 3:
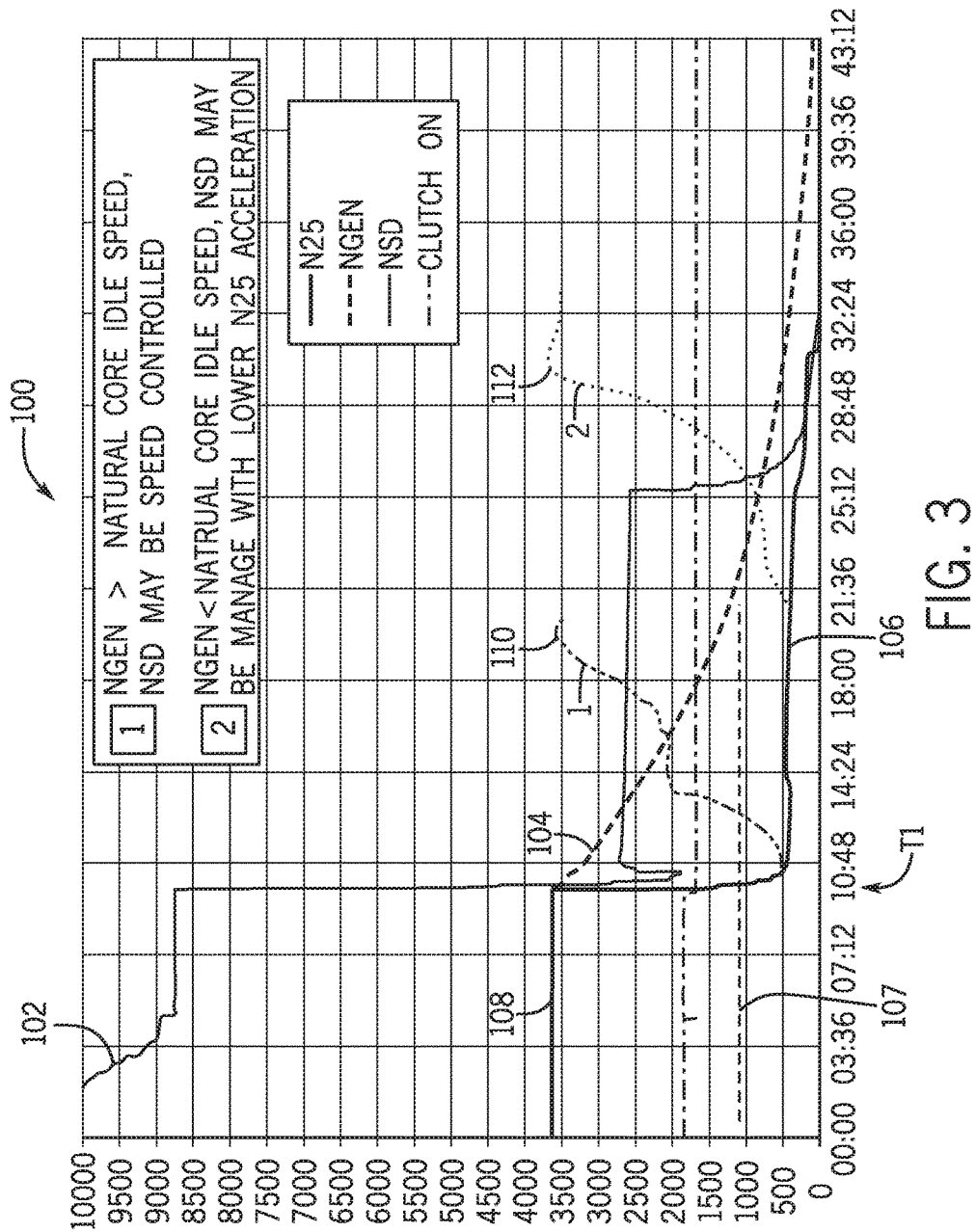
FIG. 3 is a graph slowing certain control zone curves, in accordance with an embodiment of the present approach.

FIG. 3 shows an embodiment of a chart 100 illustrative of a fast restart for the power production system 10 by applying the techniques described herein. In the depicted embodiment, curve 102 is representative of speed for the shaft 41, curve 104 is representative of speed for the generator shaft 45, and curve 106 is representative of speed for power turbine shaft 43. The chart 100 includes an X-axis having time values and a Y-axis having speed values (e.g., RPM). Actuation of the clutch 47 is illustrated via curve 108. In the depicted embodiment, a process may generally divide operations into two control zones. A first control zone is applied when the speed for the generator shaft 45 is greater than a natural core idle speed (e.g., speed of shaft 41, also known as gas generator or compressor speed, when the compressor 26 is running idle with the clutch 47 dis-engaged or with no clutch 47 in the system 10). A dashed line 107 is representative of the natural core idle speed, but it may vary but an amount (e.g., the dashed line 107 may be between 1000-1200 RPM in the depicted embodiment). A second control zone is applied when the speed for the generator shaft 45 is less than the natural core idle speed.

In the illustrated embodiment, the curve 104 is being depicted as "coming down", for example at time T1, during a shutdown sequence for the gas turbine 24. As shown, the clutch curve 108 depicts the clutch 47 being uncoupled at the time T1. Accordingly, the curves 102 and 106 show a drop in speed as the clutch 47 disengages. Before the techniques described herein, the control system 38 may have waited 40 minutes or more, for example, to wait for the curve 104 to fall, for example, to under 200 RPM or less. However, the techniques described herein enable a faster restart for the power production system 10.

In control zone one (e.g., above line 107), the power turbine 33 speed may be controlled. Accordingly, the curve 106 may be controlled to match the curve 104, for example, a controller minimum speed reference for the power turbine shaft 43 (e.g., NSDref) may be set to equal the speed of the generator shaft 45 (e.g., NGEN). That is, the NSDref is set equal NGEN and the controller than may add fuel, for example, so that the power turbine shaft 43 may be "spun up" to meet the speed of the generator shaft 45, and the clutch 47 may then be engaged. In some embodiments, NSDref may be set to a slightly lower value, e.g., by subtracting a constant such as 200 RPM, to define a tolerance window, for example, to prevent overshooting and adding undue stress on the clutch 47. The constant (e.g., 200) may be referred to as a tolerance constant. Curve 110 depicts the engagement of the clutch 47 to result in the speed of the power turbine shaft 43 controllably rising to continue power generation, after, for example, approximately 10 minutes as opposed to 40 minutes or more.

In control zone two (e.g., below line 107), an acceleration limit and the speed of the shaft 41 may be used as the clutch 47 is dis-engaged. For example, the speed reference for the power turbine shaft 43 (e.g., NSDref) may be set to equal the natural cored idle speed (e.g., line 107) but the acceleration of the compressor shaft 41 may be lowered to around the acceleration of the power turbine shaft 43 to as to minimize or eliminate a differential torque between the shafts 41, 43, and/or 45. Indeed, the acceleration of the compressor 26 may be reduced or slowed in order to reduce or slow the acceleration of the power turbine 33 to ensure a more smooth engagement, as shown by curve 112. Accordingly, by using the two aforementioned control zones, the gas production system 10 may be restarted to produce electrical power, e.g., including 10 minute restarts or less.

Figure 4:
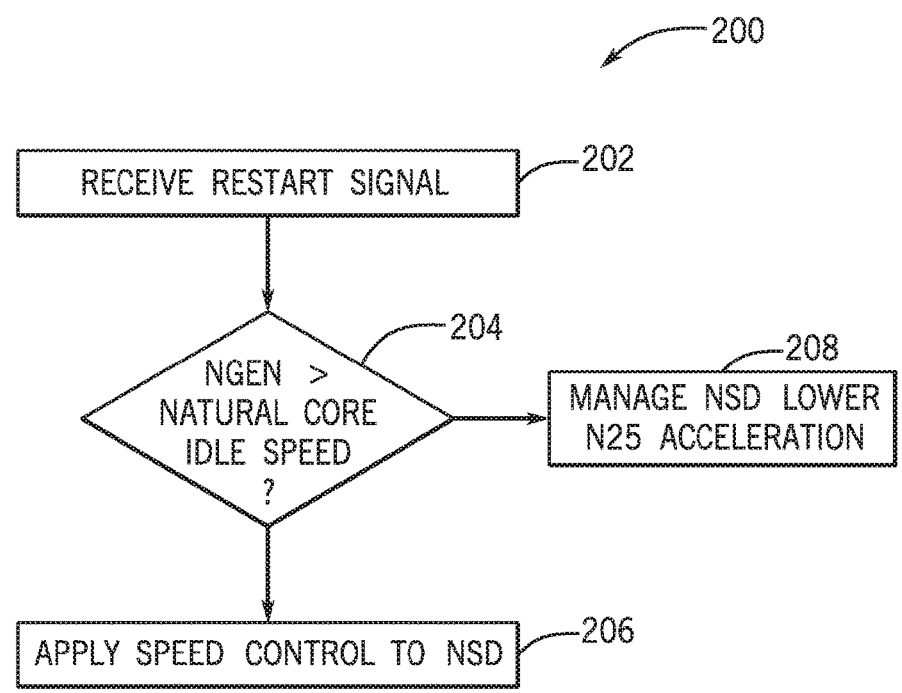
FIG. 4 is a flow chart of a process suitable for fast restarts of the power generation system of FIG. 1, in accordance with an embodiment of the present approach.

Turning now to FIG. 4, the figure illustrates an embodiment of a process 200 suitable for performing a fast restart of the power production system 10 without incurring a full shutdown. The process 200 may be implemented as computer code or instructions stored in the memory 48 and executable via the processor 50. In the depicted embodiment, the process 200 may receive (block 202) a signal to restart operations of the power production system 10, for example, from an electrical power grid. More specifically, the process 200 may receive the restart signal while a shutdown of the power production system 10 is still ongoing. Rather than wait for the shutdown to complete, the process 200 may enable a fast restart by first comparing (decision 204) the speed of the generator shaft 45 (e.g., NGEN) to the natural core idle speed. As mentioned above, the natural core idle speed is the speed of the shaft 43 when the compressor is running idle without the clutch 47 engaged and the power turbine has settled at natural speed If it is determined (decision 204) that the speed of the generator shaft 45 is greater than the natural core idle speed, then the process 200 may proceed with control zone one and apply speed control to the power turbine shaft 43 (e.g., NSD). More specifically, the controller minimum speed reference for the power turbine shaft 43 (e.g., NSDref) may be set to equal the speed of the generator shaft 45 (e.g., NGEN). In some embodiments, NSDref may be set to a slightly lower value, e.g., by subtracting 200 to define a tolerance window, for example, to prevent overshooting and adding undue stress on the clutch 47. Accordingly, the control system 38 may apply the minimum speed reference NSDref to add or remove fuel as needed match speeds of the power turbine shaft 43 to that of the generator shaft 45 with the clutch dis-engaged.

If it is determined (decision 204) that the speed of the generator shaft 45 is less than or equal to the natural core idle speed, then the process 200 may proceed with control zone two (block 208) and manage speed of the power turbine shaft 43 with lower acceleration of the gas turbine or compressor shaft 41. For example, the speed reference for the power turbine shaft 43 (e.g., NSDref) may be set to equal the natural cored idle speed but the acceleration of the compressor shaft 41 may be lowered to around the acceleration of the power turbine shaft 43 to as to minimize or eliminate a differential torque between the shafts 41, 43, and/or 45. Indeed, the acceleration of the compressor 26 may be reduced or slowed in order to reduce or slow the acceleration of the power turbine 33 to ensure a more smooth engagement. By using the two zone speed control, the process 200 may restart the power production system in 10 minutes or less without having to wait for a full shutdown.

Figure 5:
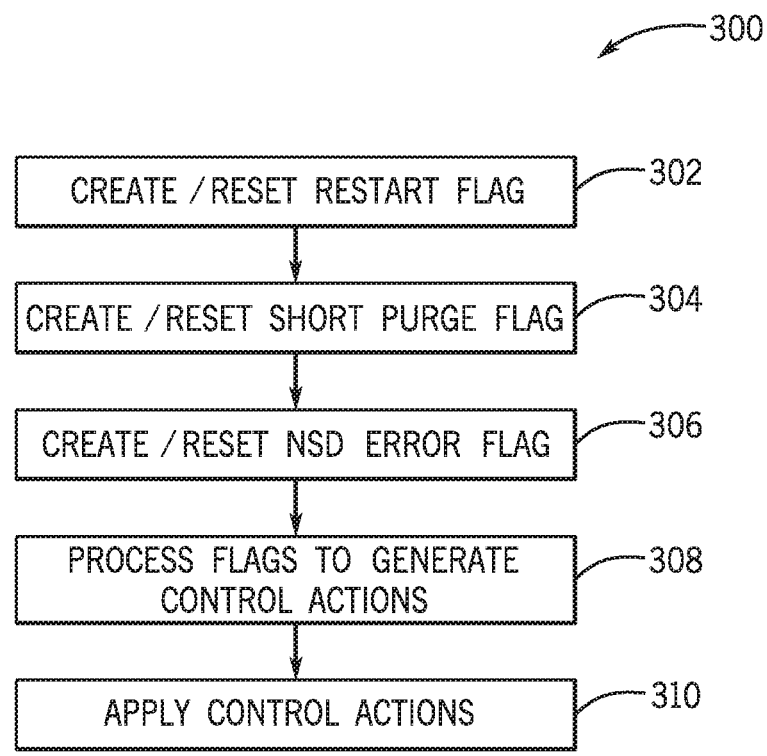
FIG. 5 is a flow chart illustrating a process applying certain flags and flag logic suitable for fast restarts of the power generation system of FIG. 1, in accordance with an embodiment of the present approach.

The process 200 of FIG. 4 may be implemented in various ways. FIG. 5 illustrates one example implementation of the process 200 that uses certain flags to provide for the two zone control during fast power production system 10 restarts. More specifically, FIG. 5 illustrates an embodiment of a process 300 that is suitable for execution in the control system 38 and useful for fast power production system 10 restarts. The process 300 may be implemented as computer code or instructions stored in the memory 48 and executable via the processor 50.

In the depicted embodiment, a restart flag may be created or reset (block 302). The restart flag may be, for example, a boolean flag useful for "if . . . then . . . " computations. In one embodiment, the restart flag may be created (e.g. set to true) when all of the following conditions are true: 1) The gas turbine 24 is set to start or has started, 2) speed of the generator 46 (NGEN) is greater than a constant, such as 300 RPM, and 3) there is no condensing. The restart flag may be reset (e.g., set to false) based on any one of the following conditions being true: 1) the clutch 47 is engaged over one second, 2) droop control is on, or 3) the gas turbine 24 is undergoing shutdown (e.g., any shutdown, normal shutdown).

The process 300 may then create (block 304) a short purge flag. The short purge flag is created and set (e.g., set to true) for when all of the following conditions are true: 1) the gas turbine is set to start or has started, and 2) the speed of the shaft 41 (e.g., N25) is greater than a constant such as 1500 RPM. The short purge flag is reset (e.g., set to false) when a duct purge is completed. To further reduce restart times, if purge short is set to true, the process 300 would change a duct purge timer to 30 seconds instead of 90 seconds.

The process 300 would also create and/or reset an NSD error flag. More specifically, the NSD error flag is created or set (e.g., set to true) if NSDref−NSD is less than a constant such as 50 RPM. The NSD error flag is then reset (e.g., set to false) if NSDref−NSD is greater than a constant, such as 80 RPM. It is to be noted that the constants mentioned herein may be adjusted based on the type of equipment or systems included in the power production system 10. For example. Each constant mentioned herein may be adjusted plus or minus between 1 and 1000 to account for such variability of equipment or systems.

The process 300 may then process (block 308) the flags mentioned earlier to generate certain control actions. For example, in one embodiment, if Restart is TRUE, the process 300 may then set NSDref to a maximum of NGEN−200, or the natural core idle speed. The process 300 may then ramp the NSDref at a constant value, such as 18 rpm/sec if the NSD error flag is TRUE. The process 300 may then step the NSDref to a constant value such as 3600 if the restart flag goes FALSE AND the clutch 47 is engaged for a constant value of about 2 seconds.

If the restart flag is TRUE, the process 300 may then switch in lower power turbine 33 speed regulator dynamics, such as those found in mechanical drive setting for compressor pumps and/or propulsion applications. Certain speed regulator gain (e.g., speed regulator gain tables) may be made adjustable. If the restart flag is TRUE, the process 300 may switch in a lower N25 adjustable acceleration rate control zone two, as mentioned above. An acceleration table may be tuned by the process 300 in speed zone two such that the power turbine acceleration rate does not exceed a maximum of a constant acceleration value such as 30 RPM/sec or whatever is specified by the clutch 47 manufacturer.

The process 300 may also create a 'Blending' multiplier A+B=1 with a constant value such as a 2 second ramp rate to ramp in/out the different settings from the paragraph above using the restart flag as input. In one example, Gain1*A+Gain2*B=final gain.

Accordingly, With: A+B=1; B=1−A, Gain1*A=Gain2*(1−A)=final gain. With A running from 0 to 1 and back to 0, e.g.: A=0:
Gain2=final gain.
E.g: A=1:
Gain1=final gain.
E.g.: A=0.1
Gain1*0.1+gain2*0.9=final gain. Accordingly, Gain1 ramps in, gain2 ramps out.

Once the blending multiplier is created, the process 300 may apply certain control actions to the power production system 10. For example, fuel and an oxidant (e.g., air) may be added or removed to arrive at the desired reference values and/or accelerations, with a desired ramp rate.

Technical effects of the invention include systems and methods for restarting a power generation system before a gas turbine system has completed or is about to complete shutdown. That is, the technical effects include restarting a power production system without incurring a wait for certain shaft speeds (e.g., gas turbine shaft, power turbine shaft, and/or electrical generator shaft) to fall below certain thresholds. The gas turbine system includes a clutch system coupling the power turbine shaft to the electric generator shaft. In certain embodiments, control during restart is divided into two control zones based on a comparison of gas turbine shaft speed to natural core idle speed, wherein the natural core idle speed comprises a speed when the compressor system is running idle with the clutch system engaged. Speed control is used in the first control zone, while acceleration control is additionally used in the second control zone. In this manner, a faster restart of the power production system is enabled.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A turbine system comprising:
   a compressor system configured to compress a fluid;
   a combustor system fluidly coupled to the compressor and configured to combust a fuel mixed with the fluid to produce a combusted fluid;
   a gas turbine system fluidly coupled to the combustor and configured to rotate a gas turbine shaft based on the combusted fluid;
   a power turbine system fluidly coupled to the gas turbine and configured to rotate a power turbine shaft based on the combusted fluid existing the gas turbine, the shaft mechanically coupled to a clutch system;
   a clutch system mechanically coupled to a generator shaft;
   an electric generator having the generator shaft and configured to produce electricity based on rotations of the generator shaft; and
   a controller operatively coupled to the clutch system and configured to restart production of the electricity via the clutch system after a request for shutting down the gas turbine system but before the gas turbine system is shut down, wherein restarting production comprises:

the controller is configured to execute a first and a second control zone based on a comparison of a gas turbine shaft speed (NGEN) to a natural core idle speed, wherein the natural core idle speed comprises a speed when the compressor system is running idle with the clutch system dis-engaged.

2. The system of claim 1, wherein the controller is configured to execute the first control zone when NGEN is greater than the natural core idle speed.

3. The system of claim 2, wherein the controller is configured to apply a speed control to the power turbine shaft by setting a power turbine shaft speed reference (NSDref) equal to the NGEN minus a tolerance constant.

4. The system of claim 1, wherein controller is configured to execute the second control zone when NGEN is less than or equal to the natural core idle speed.

5. The system of claim 4, wherein the controller is configured to set NSDref equal to the NGEN and to lower acceleration of the compressor shaft to approximately the acceleration of the power turbine shaft.

6. The system of claim 1, wherein the controller is configured to execute the first and the second control zone by setting TRUE or resetting FALSE a restart flag, a short purge flag, and a NSD error flag.

7. The system of claim 6, wherein the restart flag is set to TRUE when all of the following conditions are true: a) the gas turbine system is set to start or has started, b) NGEN is greater than 300 RPM, and wherein the restart flag is set to FALSE when the c) clutch system is engaged over one second, d) droop control is on, or e) the gas turbine system is undergoing shutdown.

8. The system of claim 7, wherein the controller is configured to execute the following logic to apply the restart flag:
   a) if restart flag is TRUE then set NSDref to a maximum of NGEN−200 or the natural core idle speed,
   b) if restart flag is TRUE and if the NSD error flag is TRUE then ramp the NSDref at approximately 18 RPM/second,
   c) if the restart flag goes FALSE and the clutch system is engaged for a constant value of about 2 seconds then step the NSDref to approximately 3600,
   d) if the restart flag is TRUE, then switch in lower power turbine speed regulator dynamics and make a speed regulator gain
   e) If the restart flag is TRUE and in control zone two, switch to a lower gas turbine shaft adjustable acceleration rate to not exceed a maximum of a constant clutch acceleration value.

9. A method for restarting a gas turbine system, comprising:
   receiving, via a controller, a request from an electric grid to restart a gas turbine system mechanically coupled to an electric generator through a plurality of shafts having a clutch system, wherein the electric generator is configured to produce electricity;
   restarting, via the controller, production of the electricity by actuating the clutch system after the request for but before the gas turbine system is shut down, wherein restarting production comprises:
   executing, via the controller, a first and a second control zone based on a comparison of a gas turbine shaft speed (NGEN) to a natural core idle speed, wherein the natural core idle speed comprises a speed when the compressor system is running idle with the clutch system dis-engaged, wherein the plurality of shafts comprise at least a turbine generator shaft, a power turbine shaft, and an electric generator shaft, and wherein the clutch system mechanically couples the power turbine shaft to the electric generator shaft.

10. The method of claim 9, comprising executing, via the controller, the first control zone when NGEN is greater than the natural core idle speed.

11. The method of claim 10, comprising applying, via the controller, a speed control to the power turbine shaft by setting a power turbine shaft speed reference (NSDref) equal to the NGEN minus a tolerance constant.

12. The method of claim 9, comprising executing the second control zone when NGEN is less than or equal to the natural core idle speed.

13. The method of claim 12, comprising setting, via the controller, NSDref equal to the NGEN and to lower acceleration of the compressor shaft to approximately the acceleration of the power turbine shaft.

14. The method of claim 9, comprising executing the first and the second control zone by setting TRUE or resetting FALSE a restart flag, a short purge flag, and a NSD error flag.

15. A non-transitory, computer-readable medium comprising executable code comprising instructions configured to:
   receive a request from an electric grid to restart a gas turbine system mechanically coupled to an electric generator through a plurality of shafts having a clutch system, wherein the electric generator is configured to produce electricity;
   restart production of the electricity by actuating the clutch system after the request for but before the gas turbine system is shut down, wherein restarting production comprises:
   executing a first and a second control zone based on a comparison of a gas turbine shaft speed (NGEN) to a natural core idle speed, wherein the natural core idle speed comprises a speed when the compressor system is running idle with the clutch system engaged, wherein the plurality of shafts comprise at least a turbine generator shaft, a power turbine shaft, and an electric generator shaft, and wherein the clutch system mechanically couples the power turbine shaft to the electric generator shaft.

16. The non-transitory, computer-readable medium of claim 15, wherein the instructions are configured to execute the first control zone when NGEN is greater than the natural core idle speed.

17. The non-transitory, computer-readable medium of claim 15, wherein the instructions are configured to execute the second control zone when NGEN is less than or equal to the natural core idle speed.

18. The non-transitory, computer-readable medium of claim 17, wherein the instructions are configured to set, via the controller, NSDref equal to the NGEN and to lower acceleration of the compressor shaft to approximately the acceleration of the power turbine shaft.

19. The non-transitory, computer-readable medium of claim 15, wherein the instructions are configured to execute the first and the second control zone by setting TRUE or resetting FALSE a restart flag, a short purge flag, and a NSD error flag.

* * * * *